United States Patent
Gandhi et al.

(10) Patent No.: US 9,376,949 B2
(45) Date of Patent: Jun. 28, 2016

(54) AIR-INJECTION SYSTEM TO IMPROVE EFFECTIVENESS OF SELECTIVE CATALYTIC REDUCTION CATALYST

(71) Applicants: FORD GLOBAL TECHNOLOGIES, LLC, Dearborn, MI (US); Sangeeta G. Shah

(72) Inventors: Harendra S. Gandhi; Robert Walter McCabe, Novi, MI (US); Joseph Robert Theis, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/319,456

(22) Filed: Jun. 30, 2014

(65) Prior Publication Data

US 2014/0311126 A1    Oct. 23, 2014

Related U.S. Application Data

(62) Division of application No. 12/103,805, filed on Apr. 16, 2008, now Pat. No. 8,776,498.

(51) Int. Cl.
*F01N 3/00* (2006.01)
*F01N 3/10* (2006.01)
(Continued)

(52) U.S. Cl.
CPC ............ *F01N 3/206* (2013.01); *B01D 53/945* (2013.01); *B01D 53/9418* (2013.01);
(Continued)

(58) Field of Classification Search
CPC ... F01N 2610/02; F01N 3/2066; F01N 3/208; F01N 3/22; F01N 13/02; F01N 3/0807; F01N 3/101; F01N 3/0842; F01N 3/106; F01N 3/2053; F01N 3/206; F01N 3/30; F01N 13/009; F01N 2370/02; B01D 2251/11; B01D 2251/2062; B01D 2251/2067; B01D 2255/1021; B01D 2255/1023; B01D 2255/1025; B01D 53/9418; B01D 53/9422; B01D 53/945; B01D 53/9477; Y02T 10/22; Y02T 10/24

USPC ............................ 60/274, 286, 289, 301, 303
See application file for complete search history.

(56) References Cited

U.S. PATENT DOCUMENTS 3,896,616 A * 7/1975 Keith et al. ............... 60/274
5,850,734 A   12/1998 Ketcham
(Continued)

FOREIGN PATENT DOCUMENTS

CN    1832794 A    9/2006
CN    1935335 A    3/2007
(Continued)

OTHER PUBLICATIONS

"Series Production of Bosch Denoxtronic for SCR Catalytic Converters," <http://www.all4engineers.com/index.php; sid=e5526babed133b6f1821527c839417d2/site=a4e/Ing=en/do=show/alloc=1/id=4886>.
(Continued)

*Primary Examiner* — Jesse Bogue
*Assistant Examiner* — Diem Tran
(74) *Attorney, Agent, or Firm* — Damian Porcari; Brooks Kushman P.C.

(57) ABSTRACT

Embodiments are described to improve the durability of a lean $NO_x$ aftertreatment system. According to one embodiment of the present invention an air injection system is used to inject air continuously into the exhaust system between the upstream three-way catalyst and the downstream selective catalytic reduction (SCR) catalyst when the engine is operating at stoichiometric or rich air/fuel ratios and the exhaust temperatures are above a calibratable level (e.g., 700° C.). In another embodiment, an oxidation catalyst is positioned downstream of the air injection point to prevent exothermic reactions from occurring on the SCR. In another embodiment, the reductant for the SCR is generated in-situ. In yet another embodiment, a diverter valve with a reduction catalyst in a bypass arm is utilized to bypass the SCR during high load conditions.

12 Claims, 3 Drawing Sheets

(51) Int. Cl.
  *F01N 3/20* (2006.01)
  *B01D 53/94* (2006.01)
  *F01N 3/08* (2006.01)
  *F01N 3/30* (2006.01)
  *F01N 13/00* (2010.01)

(52) U.S. Cl.
  CPC ......... *B01D 53/9477* (2013.01); *F01N 3/0807* (2013.01); *F01N 3/0842* (2013.01); *F01N 3/101* (2013.01); *F01N 3/106* (2013.01); *F01N 3/2053* (2013.01); *F01N 3/2066* (2013.01); *F01N 3/30* (2013.01); *F01N 13/009* (2014.06); *B01D 53/9422* (2013.01); *B01D 2251/11* (2013.01); *B01D 2251/2062* (2013.01); *B01D 2251/2067* (2013.01); *B01D 2255/1021* (2013.01); *B01D 2255/1023* (2013.01); *B01D 2255/1025* (2013.01); *B01D 2255/206* (2013.01); *B01D 2255/2092* (2013.01); *B01D 2255/20738* (2013.01); *B01D 2255/20746* (2013.01); *B01D 2255/50* (2013.01); *B01D 2255/908* (2013.01); *B01D 2255/91* (2013.01); *B01D 2258/012* (2013.01); *F01N 2370/02* (2013.01); *F01N 2610/02* (2013.01); *Y02T 10/22* (2013.01); *Y02T 10/24* (2013.01)

(56) References Cited

U.S. PATENT DOCUMENTS

| | | | |
|---|---|---|---|
| 5,910,097 A | 6/1999 | Boegner et al. | |
| 6,167,699 B1 | 1/2001 | Johnston | |
| 6,170,259 B1 | 1/2001 | Boegner et al. | |
| 6,173,568 B1 | 1/2001 | Zürbig et al. | |
| 6,244,044 B1 | 6/2001 | Bartley | |
| 6,363,716 B1 * | 4/2002 | Balko et al. | 60/286 |
| 6,502,391 B1 | 1/2003 | Hirota et al. | |
| 6,755,014 B2 | 6/2004 | Kawai | |
| 6,826,906 B2 | 12/2004 | Kakwani et al. | |
| 6,832,473 B2 | 12/2004 | Kupe et al. | |
| 6,832,474 B2 | 12/2004 | Hirooka | |
| 6,915,629 B2 * | 7/2005 | Szymkowicz | 60/289 |
| 6,955,042 B1 | 10/2005 | Wnuck et al. | |
| 6,973,777 B2 | 12/2005 | Bayerle | |
| 7,121,079 B2 | 10/2006 | Calvo | |
| RE39,720 E * | 7/2007 | Murphy et al. | 60/286 |
| 7,390,469 B2 | 6/2008 | Montreuil et al. | |
| 7,650,746 B2 | 1/2010 | Hu et al. | |
| 2004/0083716 A1 | 5/2004 | Twigg | |
| 2004/0258594 A1 | 12/2004 | Andreasson | |
| 2007/0048204 A1 | 3/2007 | Mital | |
| 2009/0188240 A1 | 7/2009 | Suzuki | |

FOREIGN PATENT DOCUMENTS

| | | |
|---|---|---|
| EP | 0758714 A1 | 2/1997 |
| JP | 2007332881 A | 12/2007 |
| WO | 2005073526 A1 | 11/2005 |

OTHER PUBLICATIONS

English Translation of Office Action dated Jan. 22, 2013, for corresponding Chinese Application 200910129936.3.

English Translation of Office Action dated Sep. 13, 2013, for corresponding Chinese Application 200910129936.3.

* cited by examiner

AIR-INJECTION SYSTEM TO IMPROVE EFFECTIVENESS OF SELECTIVE CATALYTIC REDUCTION CATALYST

CROSS-REFERENCE TO RELATED APPLICATIONS

This application is a division of U.S. application Ser. No. 12/103,805 filed Apr. 16, 2008, now U.S. Pat. No. 8,776,498 issued Jul. 15, 2014, the disclosure of which is hereby incorporated in its entirety by reference herein.

TECHNICAL FIELD

One aspect of the present invention relates to a selective catalytic reduction (SCR) system for controlling $NO_x$ emissions during lean operation on gasoline engines that has improved durability due to the addition of an air injection system that protects the SCR catalyst from unfavorable conditions. Other aspects of the invention include the use of an air injection system to protect the SCR catalyst in conjunction with other catalysts and in-situ systems so that the SCR is durable and effective for lean $NO_x$ conversion at light load conditions and fully supported by other catalyst systems for high load operation.

BACKGROUND

The need to reduce the emission of harmful byproducts and the ever-increasing pressures to increase fuel economy are ongoing challenges with internal combustion engines. $NO_x$, which consists of the oxides of nitrogen, constitute a major component of these byproducts.

Lean-burn engines are designed to operate with a very lean air-fuel ratio during light load conditions, in contrast to traditional gasoline engines which are designed to run at a chemically correct (stoichiometric) air fuel ratio of about 14.7:1—which is optimal for three-way catalyst performance. Lean burn engines mix excess air with the fuel during light load conditions when full power is not needed, resulting in better fuel economy. The air/fuel ratio in lean burn port-fuel-injected gasoline engines can be as high as 22:1, and for direct-injected (DI) gasoline engines operating under stratified-charge conditions, the air/fuel ratio can be as high as 30:1. When full power is needed during heavy load conditions, such as during acceleration or hill climbing, a lean burn engine reverts to a stoichiometric (14.7:1) ratio or richer.

To illustrate the tradeoffs, if engine efficiency is increased by increasing the air to fuel ratio to a lean condition, carbon monoxide and particulate emissions are reduced. However, the three-way catalyst that is used for emission control on current stoichiometric engines has inadequate $NO_x$ conversion efficiency in a lean atmosphere. Conversely, if the combustion process is modified to reduce nitrogen oxide production, i.e., by running the engine under rich-burn (excess fuel) conditions, particulates, carbon monoxide, and hydrocarbon emissions are increased and fuel efficiency is drastically reduced.

Selective Catalytic Reduction (SCR) is the process of selectively reducing $NO_x$ across a catalyst under lean conditions. Selective catalytic reduction with a reductant, such as urea or $NH_3$, is an effective technology for treating the $NO_x$ emissions from diesel engines. The SCR catalyst uses base metals to promote the reaction between $NO_x$ and $NH_3$ in order to produce $N_2$ and $H_2O$ under lean conditions. SCR catalysts can reduce $NO_x$ over a broad range of temperature, and since they contain no precious metals, they are a cost-effective approach for diesel $NO_x$ control. One issue with SCR is the need to carry an extra reductant on board the vehicle. This reductant is usually urea since there are safety issues with the handling of $NH_3$. The urea breaks down into $NH_3$ in the exhaust system, and the $NH_3$ reacts with $NO_x$ over the SCR to form $N_2$.

Selective Catalytic Reduction (SCR) with urea or $NH_3$ injection is also a leading candidate for $NO_x$ control on lean-burn gasoline engines, either lean-burn port-fuel-injected (PFI) or stratified-charge DI engines. However, gasoline engines normally operate at stoichiometric or rich A/F ratios during high load operation, and the resulting hot rich exhaust or hot stoichiometric exhaust is detrimental to the durability of the SCR catalyst, with the result that its $NO_x$ conversion capability is lowered.

Accordingly there exists a need to protect the SCR catalyst during high temperature rich or stoichiometric operation, so that high $NO_x$ conversion efficiency can be maintained when the exhaust temperatures are lowered and the air/fuel ratio returns to a lean condition.

SUMMARY

According to one embodiment of the present invention, a durable catalyst system for the reduction of harmful emissions from a lean-burn gasoline engine exhaust stream is provided, comprising a light-off catalyst closely coupled to the engine, a selective catalytic reduction catalyst positioned downstream of the light-off catalyst; a reductant injection system positioned between the light-off catalyst and the selective catalytic reduction catalyst; and an air injection system positioned between the light-off catalyst and the location for reductant injection to inject air into the exhaust stream at predesignated engine conditions to improve the durability of the selective catalytic reduction catalyst.

According to another embodiment of the present invention, a method of improving the durability of a catalyst system for the reduction of harmful emissions from lean-burn gasoline engines is provided, comprising the following steps; providing a catalyst system that includes a light-off catalyst closely coupled to the engine and a selective catalytic reduction catalyst positioned downstream from the light-off catalyst; and injecting air between the light-off catalyst and the selective catalytic reduction catalyst at certain designated engine conditions that are harmful for the durability of the selective catalytic reduction catalyst.

In another embodiment of the invention, a method of improving the durability of a catalyst system for the reduction of harmful emissions from gasoline engine exhaust emissions is provided, comprising the following steps; providing a catalyst system that includes a light-off catalyst closely coupled to the engine and a selective catalytic reduction catalyst positioned downstream from the light-off catalyst; injecting air between the light-off catalyst and the selective catalytic reduction catalyst at certain designated engine conditions; injecting a reductant upstream of the selective catalytic reduction catalyst when the temperatures are within the operating range of the selective catalytic reduction catalyst; and providing an oxidation catalyst positioned between the air injection position and the reductant injection position to prevent exothermic reactions from occurring on the SCR catalyst and causing thermal degradation.

In another embodiment of the invention, a durable catalyst system for the reduction of harmful emissions from a lean-burn gasoline engine exhaust stream is provided, comprising a light-off catalyst closely coupled to the engine, a selective catalytic reduction catalyst positioned downstream of the light-off catalyst; a reductant injection system positioned between the light-off catalyst and the selective catalytic reduction catalyst; a diverter valve positioned downstream of the location for reductant injection and upstream of the SCR, the diverter valve being connected to a bypass arm that includes a three-way catalyst, which can be utilized to bypass the SCR and improve $NO_x$ conversion under high load conditions.

In yet another embodiment of the invention, ammonia is produced in-situ by a lean $NO_x$ trap upstream of the selective catalytic reduction catalyst during the rich purge periods, and the air injection system is located between the lean $NO_x$ trap and the selective catalytic reduction catalyst so that air may be injected at certain designated engine conditions that are harmful for the durability of the selective catalytic reduction catalyst.

These and other aspects of the present invention will be better understood in view of the following detailed description of the invention.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

Figure 1:
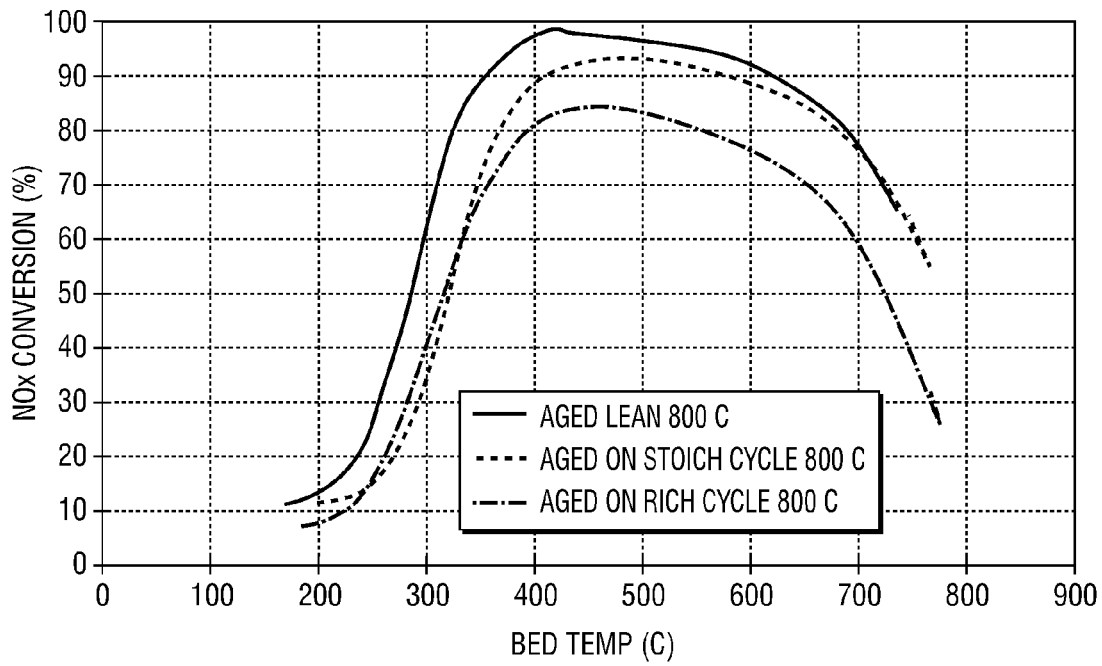
FIG. 1 shows $NO_x$ conversion vs. temperature for iron/zeolite SCR catalysts to demonstrate that the iron/zeolite SCR is more durable in lean exhaust than in rich or stoichiometric exhaust.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Selective catalytic reduction (SCR) catalysts are a leading candidate for $NO_x$ control during lean operation on gasoline engines. The SCR catalyst uses base metals to promote the reaction between $NO_x$ and $NH_3$ to produce $N_2$ under lean conditions. Compared to other existing technologies, SCR catalysts are advantageous as they operate over a broad range of temperatures, are robust to the feedgas $NO_x$ concentration, and are cost-effective as they do not require the use of precious metals. However, during high load operation, gasoline engines normally operate at stoichiometric or rich air/fuel ratios and the resulting hot rich exhaust or hot stoichiometric exhaust is detrimental to the durability of the SCR catalyst. Under such hot conditions, the SCR catalyst must be protected, to maintain the SCR catalyst's $NO_x$ conversion capability when the exhaust temperatures are lowered and the air/fuel ratio returns to a lean condition.

The SCR formulations currently being developed for vehicle application include an iron/zeolite formulation and a copper/zeolite formulation.

Under one embodiment of this invention, the SCR catalyst is protected from such hot conditions, through the use of air injection or pulse-air to inject air continuously into the exhaust between the close-coupled light-off catalyst, e.g. three-way catalyst (TWC) and the SCR catalyst when the engine is operating at stoichiometric or rich A/F ratios and the exhaust temperatures are above a calibratable level (e.g., 700° C.). This will result in an overall lean mixture and avoid exposing the SCR catalyst to hot rich or hot stoichiometric conditions. The injected air will also cool the hot exhaust, which also would be beneficial for the durability of the SCR.

To demonstrate that the SCR is more durable in lean exhaust than in rich or stoichiometric exhaust, samples of an iron/zeolite SCR catalyst were aged for 34 hours at an inlet temperature of 800° C. on a pulse-flame combustion reactor. One sample was aged on a durability cycle where the A/F ratio was rich for a majority of the time. Another sample was aged on a durability cycle where the A/F ratio was at stoichiometry for a majority of the time. A third SCR sample was aged continuously at a lean A/F ratio by injecting oxygen into the exhaust. The 3 aged samples were evaluated on a laboratory reactor where the feedgas contained 500 ppm of NO and 500 ppm of $NH_3$, along with 5% $O_2$, 10% $CO_2$, 10% $H_2O$, and the balance $N_2$. The temperature of the furnace was ramped slowly from a furnace temperature of 150° C. to a temperature above 800° C. A type K thermocouple was used to measure the bed temperature of the SCR catalyst.

The $NO_x$ conversion of the 3 samples is shown as a function of the measured temperature in FIG. 1.

FIG. 1 illustrates $NO_x$ conversion vs. temperature for iron/zeolite SCR catalysts aged for 34 hours at 800° C. on a pulse-flame combustion reactor with either a primarily rich aging cycle, a primarily stoichiometric aging cycle, or a continuously lean aging cycle. Evaluated on a laboratory reactor during slow temperature ramps with 500 ppm NO and 500 ppm $NH_3$.

The sample aged with continuous lean exhaust had much better performance than the sample aged on the schedule with primarily stoichiometric operation, which in turn had slightly better $NO_x$ conversion than the sample aged on the schedule with primarily rich operation. This demonstrates that the durability of the iron/zeolite SCR catalyst is better in high temperature lean exhaust than in high temperature stoichiometric or rich exhaust.

Figure 2:
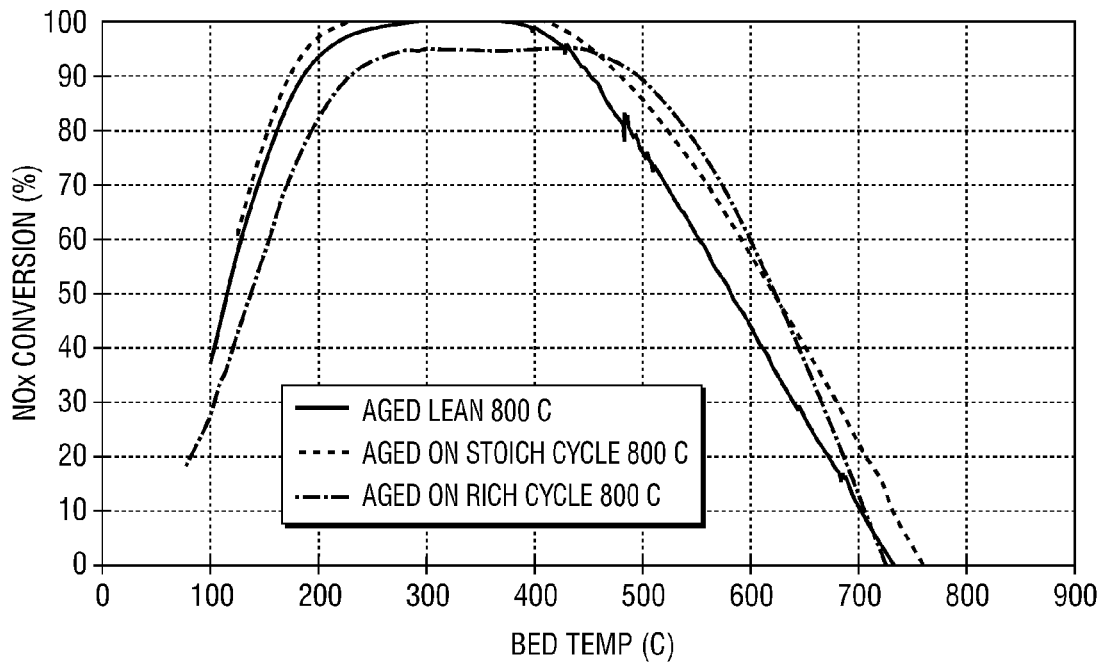
FIG. 2 shows $NO_x$ conversion vs. temperature for copper/zeolite SCR catalysts to demonstrate that the copper/zeolite SCR is more durable in lean or stoichiometric exhaust than in rich exhaust.

FIG. 2 shows similar data for samples of a copper/zeolite SCR catalyst that were aged with an inlet temperature of 800° C. Again, rich aging is more detrimental to the catalyst than stoichiometric or lean aging.

FIG. 2 illustrates $NO_x$ conversion vs. temperature for copper/zeolite SCR catalysts aged for 34 hours at 800° C. on a pulse-flame combustion reactor with either a primarily rich aging cycle, a primarily stoichiometric aging cycle, or a continuously lean aging cycle. Evaluated on a laboratory reactor during slow temperature ramps with 500 ppm NO and 500 ppm $NH_3$.

One issue with the proposed system is that, when the A/F ratio of the engine is rich, the close-coupled TWC cannot convert all of the HC, CO, or $H_2$ in the exhaust due to a lack of oxygen. Therefore, some of these reductants will pass through the TWC. The active ingredient of a SCR catalyst is a transition metal. At high temperatures, this transition metal will be active for oxidizing $H_2$, CO, and HC. So if air is added to the rich exhaust, an exotherm can be created on the transition metals of the SCR, which can promote coarsening of the transition metal and degrade the $NO_x$ performance of the SCR catalyst. A potential solution to this problem is to place an additional oxidation catalyst (e.g., a Pd-based TWC) between the air injection point and the urea/$NH_3$ injection point. The reductants that pass through the first TWC will be oxidized on the oxidation catalyst, (e.g. Pd-based TWC), preventing the exothermic reactions from occurring on the transition metals of the SCR. Pd catalysts are known to be durable in hot, lean exhaust and are thus preferred. At lower temperatures, when urea is being injected into the exhaust to reduce the $NO_R$, it is important that the urea or $NH_3$ be injected downstream of the Pd-based TWC, to prevent the Pd from oxidizing the $NH_3$ to NO or $N_2$. The complete system is shown in FIG. 3.

Figure 3:
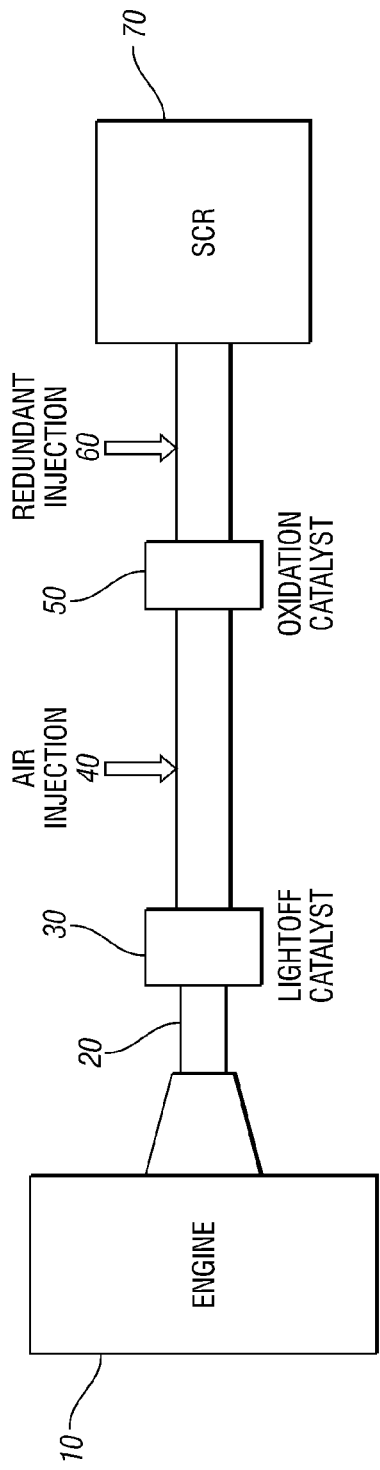
FIG. 3 is a schematic of a proposed exhaust system including air injection and reductant injection and an oxidation catalyst to minimize exothermic reactions on the selective catalytic reduction catalyst.

FIG. 3 illustrates a lean $NO_x$ aftertreatment system for the exhaust emissions 20 from a lean-burn gasoline engine 10, including a light-off catalyst 30, that is closely coupled to the engine 10, an oxidation catalyst 50 that is downstream of the light-off catalyst 30, but upstream of the selective catalytic reduction (SCR) catalyst 70. An air injection system 40 is then positioned between the light-off catalyst 30 and the oxidation catalyst 50 to protect the durability of the SCR catalyst 70. As set forth in FIG. 3, under this embodiment, a reductant, such as urea or $NH_3$ is injected at a position 60 upstream of the SCR 70 to drive the process of selectively reducing $NO_x$ under lean conditions.

The light-off catalyst 30 is typically a three-way catalyst used in close-coupled location to the engine 10, that preferably contains alumina, rhodium, platinum and/or palladium, and also contains oxygen storage materials (i.e., ceria or ceria/zirconia mixtures) for three-way activity at stoichiometry.

The selective catalytic reduction catalyst 70 is preferably made from copper/zeolite or iron/zeolite formulations. It could also be a titania/vanadia formulation with tungsten or molybdenum as additives.

The oxidation catalyst 50, positioned after air injection 40, is preferably a three-way catalyst containing alumina and low loadings (e.g., 2 to 10 gpcf) of precious metal (PGM), preferably palladium (Pd) although platinum (Pt) or mixtures of Pd and Pt could also be utilized. For the oxidation catalyst 50, no rhodium is needed since this catalyst is not being used for NO reduction. The oxidation catalyst 50 can contain oxygen storage materials (e.g., ceria or ceria/zirconia mixtures) for improved durability but it is not necessary.

Figure 4:
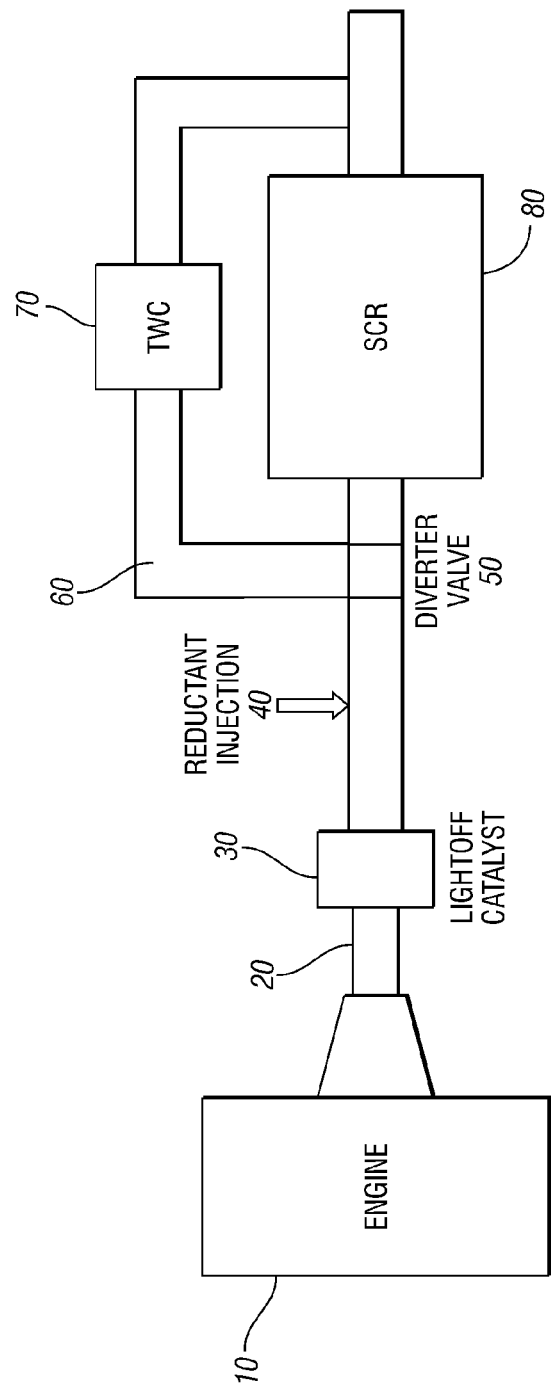
FIG. 4 is a schematic that depicts an exhaust system with a diverter valve and by-pass arm containing an additional three-way catalyst.

An alternate embodiment is shown in FIG. 4. Under this embodiment, to protect the SCR from hot, rich conditions is to use an electronically-controlled diverter valve 50, is used in conjunction with a three-way catalyst 70 containing by-pass arm 60, to bypass the SCR 80 during high load operation. The SCR 80 cannot provide significant $NO_x$ reduction under hot, rich conditions, as it is active for $NO_x$ reduction primarily under lean conditions. Also, the exhaust temperatures will be too hot for effective $NO_x$ control from the SCR. Therefore, the diverter valve 50 can direct the exhaust 20 around the SCR 80 during high load operation, in order to preserve the SCR so it can continue to effectively treat the $NO_x$ emissions during low-load and mid-load operation, where the temperatures are more conducive for $NO_x$ conversion. A thermistor in the exhaust 20 or a predictive mathematical model could be used to determine when the exhaust 20 should be bypassed around the SCR 80.

With this system, the SCR would convert the $NO_x$ during low to medium loads when the engine 10 is running lean, and the three-way catalyst 70 in the bypass-arm 60 would provide additional $NO_x$ reduction and thereby supplement the $NO_x$ reduction of the light-off catalyst 30 at high loads when the engine 10 is running at stoichiometric or rich conditions.

The reduction catalyst 70 in the bypass arm 60, is preferably a three-way catalyst that contains alumina and low loadings (e.g., 2 to 10 gpcf) of rhodium and palladium and/or platinum, it could also contain zirconia. The reduction catalyst 70 in the bypass arm 60 can also contain oxygen storage materials (e.g., ceria or ceria/zirconia) to improve $NO_x$ conversion and durability.

Figure 5A:
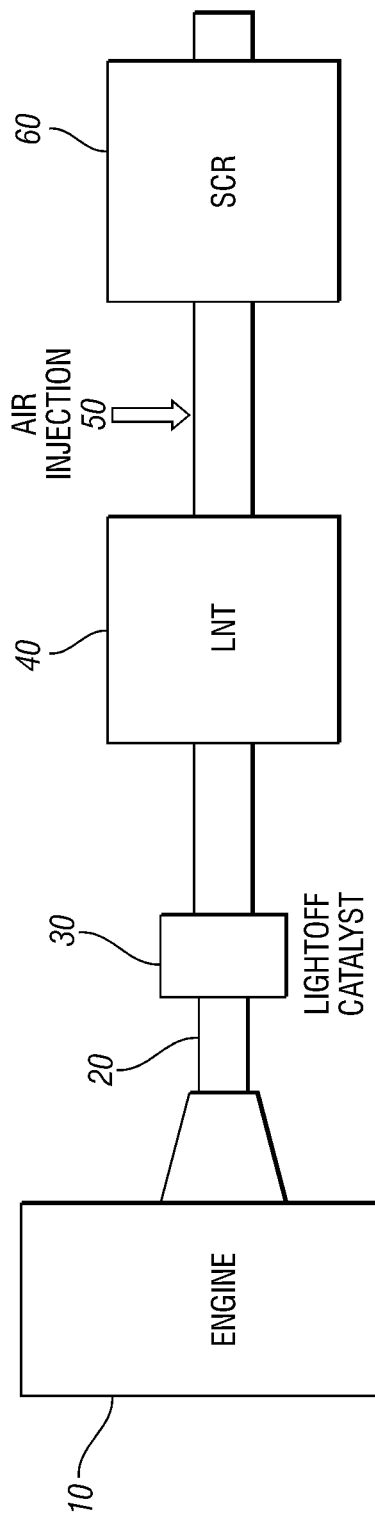
FIGS. 5A and 5B are schematics that depict a LNT+SCR in-situ system with air injection to protect the SCR catalyst.
Figure 5B:
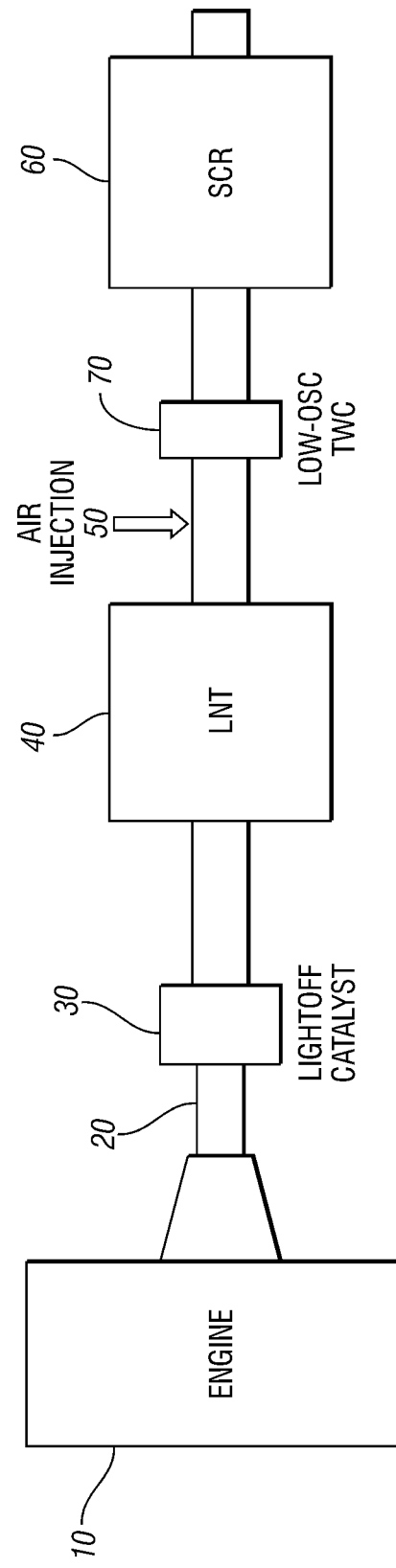

In yet another embodiment, a reductant is manufactured in-situ, as shown in FIGS. 5A and 5B. As shown in FIG. 5A, in an alternate embodiment, a lean $NO_x$ trap (LNT) 40 and SCR 60 are used so that when the engine 10 is run on a lean/rich cycle, the $NH_3$ generated by the LNT 40 during the rich purge periods is used as a reductant for the downstream SCR 60. A copper-based SCR improves the low temperature performance of the system compared to the LNT alone. Under this embodiment, an air injection system 50 is added between the LNT 40 and the SCR 60 so that, when the temperatures are high and the A/F ratio is rich, the SCR 60 is protected.

As a further embodiment, as shown in FIG. 5B, a low-loaded oxidation catalyst or TWC 70 could be added between the air injection point 50 and the SCR 60. Again, this would minimize the exothermic reactions on the SCR 60 when the engine is running rich and air is being added in front of the SCR, as the exothermic reactions would cause thermal degradation of the SCR 60.

Under the embodiment illustrated in FIGS. 5A and 5B, the light-off catalyst is a three-way catalyst used in close-coupled location to the engine 20 that preferably contains alumina, rhodium, and platinum and/or palladium, and also contains oxygen storage materials (i.e., ceria or ceria/zirconia mixtures) for three-way activity at stoichiometry.

Under the embodiment illustrated in FIGS. 5A and 5B, LNT 40 preferably contains alumina, $NO_x$ storage materials (e.g., barium), platinum, and rhodium. Palladium and oxygen storage materials (e.g., ceria or ceria/zirconia) are optional. For this LNT, PGM loadings are typically 15 to 100 gpcf.

Under the FIG. 5A and 5B embodiments, SCR catalyst 60 preferably is made from copper/zeolite or iron/zeolite formulations.

Finally, under the FIG. 5B embodiment, the low oxygen storage capacity (OSC) TWC catalyst 70 preferably contains alumina and low loadings (e.g., 2 to 10 gpcf) of precious metal, preferably palladium (Pd) but platinum (Pt) or mixtures of Pd and Pt can also be utilized. For the low oxygen storage capacity (OSC) TWC catalyst 70, no rhodium is needed since this catalyst is not being used for $NO_x$ reduction. The low OSC TWC catalyst 70 preferably contains no oxygen storage materials (e.g., ceria or ceria/zirconia mixtures) to minimize the amount of ammonia that is consumed by this catalyst during the rich purge periods, although a very small amount of OSC materials could be used to improve the durability of the catalyst.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A durable catalyst system for the reduction of emissions from a gasoline engine exhaust stream, comprising:
   a light-off catalyst closely coupled to the engine;
   a selective catalytic reduction catalyst positioned downstream of the light-off catalyst;
   a reductant injection system positioned between the light-off catalyst and the selective catalytic reduction catalyst; and
   an air injection system positioned between the light-off catalyst and the location for reductant injection to inject air into the exhaust stream at designated engine conditions to improve the durability of the selective catalytic reduction catalyst,
   wherein an oxidation catalyst is positioned between the location for air injection and the location for reductant injection to prevent exothermic reactions from occurring on the selective reduction catalyst and impairing durability.

2. The system of claim 1, wherein engine controls are provided that operate in conjunction with the air injection system to inject air into the exhaust stream under designated conditions to improve the durability of the selective catalytic reduction catalyst.

3. The system of claim 1, wherein the air injection system is a pump that provides a continuous stream of air under the designated conditions.

4. The system of claim 1, wherein the air injection system provides pulsed air under the designated conditions.

5. The system of claim 1, wherein the light-off catalyst is a three-way catalyst.

6. The system of claim 1, wherein the oxidation catalyst is a Pd-based three-way catalyst having a Pd loading between 2 and 10 pgcf.

7. The system of claim 1, wherein the reductant that is injected is ammonia.

8. The system of claim 1, wherein the reductant that is injected is urea.

9. A method of improving the durability of a catalyst system for reducing emissions from lean-burn gasoline engine exhaust emissions, comprising the following steps:
   providing a catalyst system that includes a light-off catalyst closely coupled to the engine and a selective catalytic reduction catalyst positioned downstream from the light-off catalyst;
   injecting air between the light-off catalyst and the selective catalytic reduction catalyst at certain designated engine conditions that could harm the durability of the selective catalytic reduction catalyst; and
   injecting a reductant upstream of the selective catalytic reduction catalyst,
   wherein an oxidation catalyst is positioned between the location for air injection and the location for reductant injection to prevent exothermic reactions from occurring on the selective reduction catalyst and impairing durability.

10. The method of claim 9, wherein the oxidation catalyst is a Pd-based three-way catalyst having a Pd loading between 2 and 10 pgcf.

11. The method of claim 9, wherein the reductant that is injected is ammonia.

12. The method of claim 9, wherein the reductant that is injected is urea.

* * * * *